Dec. 21, 1965 K. HEDEGAARD 3,224,543
MOTOR DRIVE AND COUPLING MECHANISM FOR SEWING
AND THE LIKE MACHINES
Filed June 15, 1964 2 Sheets-Sheet 1

INVENTOR.
KRISTEN HEDEGAARD
BY *KW Nan*
ATTORNEY

Dec. 21, 1965   K. HEDEGAARD   3,224,543
MOTOR DRIVE AND COUPLING MECHANISM FOR SEWING
AND THE LIKE MACHINES
Filed June 15, 1964   2 Sheets-Sheet 2

INVENTOR.
KRISTEN HEDEGAARD
BY
ATTORNEY

United States Patent Office 3,224,543
Patented Dec. 21, 1965

3,224,543
MOTOR DRIVE AND COUPLING MECHANISM FOR SEWING AND THE LIKE MACHINES
Kristen Hedegaard, Gentofte, Denmark, assignor to G. M. Pfaff AG, Kaiserslautern, Pfalz, Germany, a corporation of Germany
Filed June 15, 1964, Ser. No. 374,950
Claims priority, application Germany, June 15, 1963,
10 Claims. (Cl. 192—145)

The present invention relates to motor drive and coupling mechanism, suitable especially, though not limitatively, for use in connection with sewing machines of the type comprising a continuously running driving motor, a main coupling and an auxiliary coupling including a drive of reduced speed derived from said motor for the operation and stoppage of the machine at a predetermined angular position during a rotation or operating cycle, such as in the "UP" or "DOWN"-position of the needle of a sewing machine.

According to a known type of coupling mechanism of the aforementioned character, rotation of the main (driving) disk or fly wheel of a friction coupling, after decelerating or braking to a reduced speed, is continued to the desired stopping position by the interposition of a suitable reduction gear set between said disk and the motor drive shaft. Such an arrangement is both complex in design and difficult to combine structurally with a motor of standard construction without undue increase of bulk and mounting space, due mainly to the fact that the reduction gearing must be arranged outside of the circumference of the coupling disk. This, in turn, results in increased cost of a coupling motor of this type.

According to another construction of a coupling motor of the referred to type known in the art, the reduction gear set is interposed, after initial braking, between the braking disk and the driving disk, said braking disk being disposed in a known manner on the side of the coupling disk opposite to the flywheel or driving disk, whereby to drive the coupling disk at a reduced speed by way of the braking disk and to continue rotation thereof to the predetermined stopping position. Here too the reduction drive or gearing has to be mounted outside of the circumference same drawbacks and difficulties as pointed out hereinbefore.

Accordingly, among the objects of the present invention is the provision of a coupling motor and stoppage mechanism of the type referred to which is substantially devoid of the aforementioned and related disadvantages and drawbacks inherent in the prior art devices or mechanisms; which is both simple and compact in design and construction so as to differ little from a motor of the same size or power devoid of special drive or stopping mechanism according to the invention; which will enable the subsequent attachment of the stoppage mechanism in a motor of standard construction; and which is both efficient and reliable in operation, as well as economical in manufacture.

The invention, both as to foregoing and ancillary objects as well as novel aspects thereof, will be better understood from the following detailed description, taken in conjunction with the accompanying drawings forming part of this specification and in which.

Like reference numerals denote like parts in the different views of the drawings.

Figure 1:
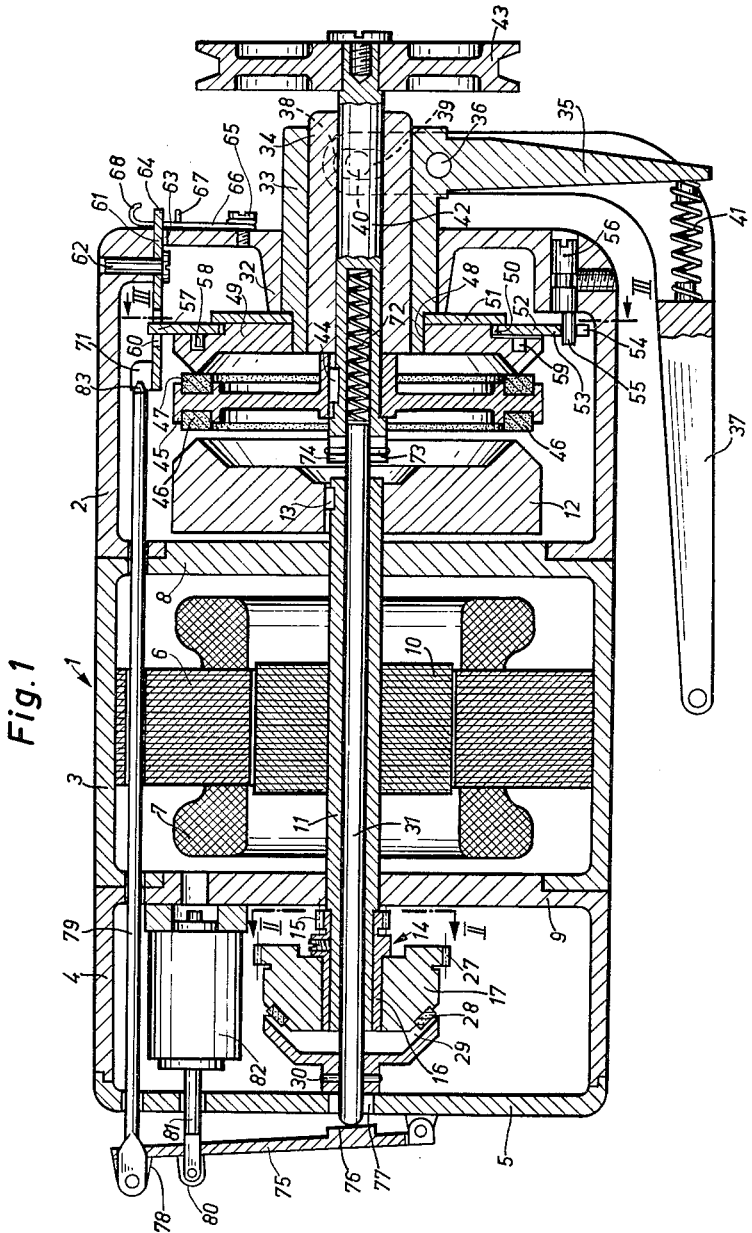
FIG. 1 is a longitudinal cross-section through a motor drive and control mechanism, being designed especially for use in connection with sewing machines and constructed in accordance with the principles of the invention.

With the foregoing objects in view, the invention involves generally the provision of an electric driving motor with coupling mechanism for the operation of the motor at a reduced speed upon disconnection of the main drive or coupling, in order to facilitate, for instance, the stoppage of the motor at a predetermined angular position of the device driven thereby, such as the stopping of a sewing machine with the needle being in either the "UP" or "DOWN"-position. For this purpose, according to the present invention the motor is fitted with a throughgoing hollow drive shaft having a first end projecting at one side and having a second end projecting at the opposite side of the motor. The coupling mechanism comprises essentially a main driving (flywheel) disk being directly secured to the first end of said shaft and an auxiliary driving disk connected to the second end of said shaft through a reduction gearing, whereby to rotate said main coupling disk at the motor speed and to rotate said auxiliary driving disk at a reduced speed during the operation of the motor. There is further provided, in accordance with the invention, an output shaft being aligned with the motor drive shaft and connectible therewith, by the aid of suitable operating means (foot pedal, etc.), through a first driven friction coupling disk mounted in axially slidable relation upon said output shaft for cooperation with said main driving disk (flywheel), in a manner well understood. In the disengaged position, the main driving disk resiliently engages a rotatably mounted braking disk or member being normally locked against rotation and unlocked for the purpose described presently.

Secured to the end of a further or auxiliary drive shaft concentric with and supported within said hollow motor shaft is an auxiliary driven coupling disk being in normally disengaged relation to said auxiliary driving disk, the opposite end of said auxiliary drive shaft being connected in axially yielding engagement with said output shaft. Finally, means are provided, preferably in the form of an electromagnetic control device, to engage said auxiliary driving and driven disks, after disengagement and braking of said main driving disk, and to simultaneously release or unlock said braking disk, in such a manner as to restart the motor at a relatively low speed through said reduction gearing. As a consequence, the output shaft may be stopped at a predetermined angular position by the aid of a suitable control device operative to disengage the auxiliary driving and driven disks and to return the device to the starting position for the commencement of a new sewing or the like operating cycle.

The mechanism for the locking and unlocking of the braking disk consists advantageously of at least one locking pin carried by a pivotally supported and spring-loaded locking member and extending into a concentric circular groove of the rotatively supported braking disk. Said member rotates about a pivot being eccentric in respect to the center of rotation of the braking disk and is resiliently urged to rotate in one direction, whereby to urge said pin against the inside wall of the groove of said braking disk, to lock the latter by the wedging effect between said wall and pin in the direction of rotation of the main coupling or driven disk, to thereby enable braking in the ordinary manner. In order to unlock the braking disk, or to disable its braking action, during rotation of the output shaft by the auxiliary driven disk at reduced speed, said locking member is adjusted, simultaneously with the engagement of said auxiliary coupling, to a position against the action of its biasing spring, where said pin is maintained midway between the walls of said groove, which has a width in excess of the diameter of said pin. Upon stoppage of the operation of the output shaft rotating at reduced speed by disengagement of the auxiliary coupling, the locking member returns to the locking position with said pin again engaging the groove of the braking disk, in a manner as will become further apparent from the following description of the drawings.

Figure 2:
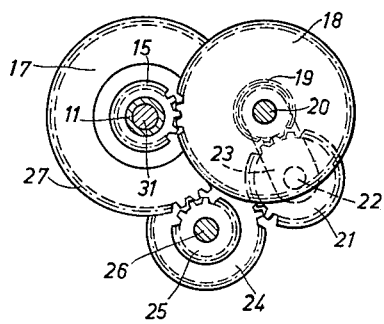
FIG. 2 is a partial view taken on line II—II of FIG. 1.

Referring more particularly to FIG. 1, the drive and coupling mechanism shown is mounted within a cylindrical housing 1 comprising three aligned parts or sections 2, 3, and 4, part 2 being in the form of a cup closed at its outer end and part 4 being closed by means of a separate cover 5. Mounted within the housing part 3 is the stator 6 of an electric motor supporting the stator winding 7, while each of the housing parts 3 and 4 includes a separating wall 8 and 9, respectively, wherein is journalled the rotor 10 by means of a hollow drive shaft 11. Mounted upon the end of the motor shaft 11 projecting into the housing part 2 is a main driving (coupling) member or flywheel 12 secured to said shaft by a key 13, while the opposite end of the motor shaft 11 projecting into the housing part 4 has secured to it a sleeve 14 which is formed with or carries a gear 15, on the one hand, and serves as a bearing 16 for an auxiliary driving (coupling) mechanism. Meshing with disk 17 of an auxiliary drive mechanism. Meshing with the gear 15 is a countergear 18, FIG. 2, being journalled, together with a gear 19 affixed thereto, upon a shaft 20 which is mounted upon the wall 9. Meshing with gear 19 is a further gear 21 journalled upon a shaft 22 supported by an arm 23 which is secured to the shaft 20. Furthermore, meshing with the gear 21 is a further gear 24 being rotatively supported by a shaft 26, also mounted upon the wall 9 together with a further gear 25 which is fixedly connected to the gear 24. Gear 25 meshes with a gear rim 27 provided upon the circumference of the auxiliary driving disk 17, whereby to rotate the latter by the motor at a reduced speed determined by the transmission ration of the reduction gear set 15–27.

Applied to the coupling disk 17, FIG. 1, is a friction lining 28 arranged for engagement with a cooperating auxiliary coupling (driven) disk 29 which is secured, by means of a cross or cotter pin 30, to the end of an auxiliary drive shaft 31 rotatively and axially displaceably mounted within the main drive shaft 11.

Extending inwardly from the end wall of the housing part 2 is a hub or flange 32 wherein is secured a sleeve 33 which encloses a further axially displaceable coupling sleeve 34. Sleeve 33 has a depending arm 35 upon an intermediate point of which is rotatively mounted, by means of a bolt 36, an angular operating lever 37 whose fork-shaped upper ends 38 are each fitted with a pin 40 engaging lateral slots 39 in the sleeve 34. A compression spring 41 engaging the arm 35, on the one hand, and engaging the lever 34, on the other hand, acts to resiliently urge the ends of the fork of the lever 37 in a direction toward the right, in the example illustrated.

Mounted within the displaceable sleeve 34 is an output shaft 42 to the end of which projecting to the outside of the sousing 1 is secured a pulley 43. Further secured to the shaft 42, at a point within the housing part 2 and by means of a key 44, is the main coupling (driven) disk 45 of the main friction coupling which on the side facing the flywheel or main driving disk 12 carries a coupling lining 46 and on its opposite side carries a braking lining 47 arranged to engage a cooperate with a braking disk 49 rotatively supported by a shoulder or offset 48 of the sleeve 33.

Figure 3:
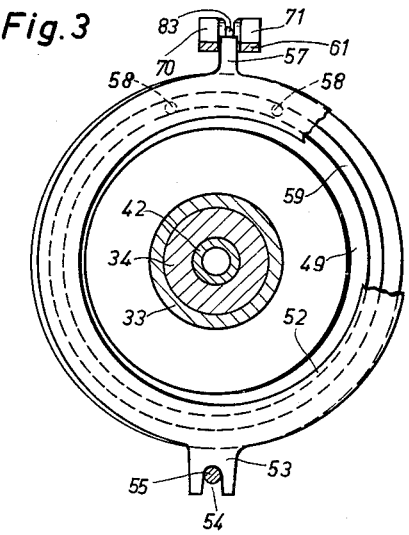
FIG. 3 is a partial view taken on line III—III of FIG. 1.

The braking disk 49 is fitted at its rear with a cylindrical extension or shoulder 50 adapted to rotatively support a locking ring 52 disposed between the disk 49, on the one hand, and a retaining ring 51 mounted upon the shoulder 49, on the other hand. The locking ring 51 has a depending radial extension 53, FIG. 3, provided with a slot 54 which is engaged by pin 55 extending from a bolt 56 which is adjustably mounted in the housing part 2. Diametrically opposite to the extension 53 the ring 52 is provided with a radial nose 57 below which are secured, at equal distances from a symmetry line passing through the nose 57 and the center of the ring 52, a pair of locking pins 58 extending at right angles to the ring 52 and into a concentric circular groove 59 in the braking disk 49, the width of the groove 59 being slightly greater than the diameter of the pins 58.

Figure 4:
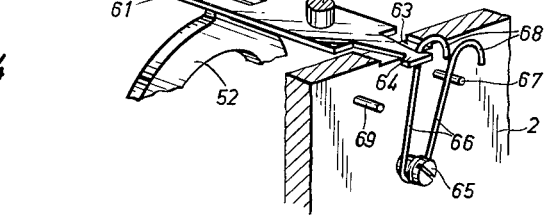
FIG. 4 is a detail perspective view of the brake release mechanism forming part of FIG. 1.

The nose 57 passes through a slot 60, FIG. 4, of a horizontal release lever 61 which is rotatively supported by a vertical bolt or pin 62 secured to the housing part 2. The end 64 of lever 61 projecting through a slot 63 in the housing part 2 is deflected in one direction by the action of a torsion spring 66 secured to the outside of the housing 2 by a screw 65 and having legs engaging the end 64, on the one hand, and a stop pin 67 also secured to the housing 2, on the other hand. The ends 68 of the spring 66 are bent to enable the same to be pressed towards one another for the removal of the spring and mounting to engage the end 64 and stop 69, to urge the lever 61 in the opposite direction, for the purpose as will become apparent as the description proceeds. The end of the lever 61 being located within the housing part 2 is fitted with a pair of tapering vertical guide lugs 70, 71 the purpose of which will be explained in connection with the description of the operation of the invention.

The driven or output shaft 42, FIG. 1, has a bore or hollow end portion at its end located in the housing part 2 which encloses a compression spring 72 resiliently engaging the end of the auxiliary drive shaft 31 extending partly into said bore. Both shafts 31 and 43 are connected with one another through a cross pin 73 mounted in the shaft 31 and engaging a slot 74 in the shaft 42.

A lever 75 being pivoted to the cover 5 and having an extension 76 which engages the end of the shaft 31 projecting through said cover, is provided at its free end with a first joint 78 of a push rod 79 and a second joint 80 of the pull rod 81 of a solenoid or electromagnetic actuator 82 mounted within the housing part 4. Rod 79 extends through the housing parts 4 and 3 and has its cone-shaped end 83 positioned between the lugs 70, 71 of the release lever 61.

Figure 5:
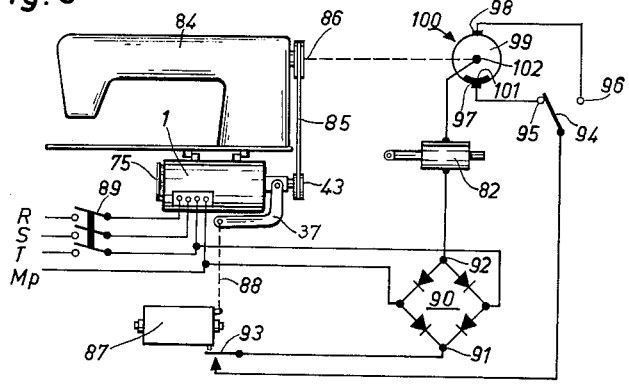
FIG. 5 is a circuit diagram showing the electrical connections for the sewing machine control shown by the preceding figures.

Referring more particularly to FIG. 5, there is shown a sewing machine 84 being driven by the motor 1 described hereinbefore through a belt or chain 85 operably connecting the driven or output shaft 42 with the drive-or arm shaft 86 of the machine by way of the pulley 43. The starting of the machine and sewing speed may be controlled in a known manner by the aid of a foot pedal 87 operably connected with the lever 37 through a pull rod or chain 88.

The motor 1 being connected to the terminals R, S, T, $M_p$ of a three-phase power circuit or network is started by the closing of a master control switch 89, whereby at the same time a rectifier 90 is energized by one phase voltage of the network, to provide a direct-current operating voltage between the rectifier output terminals 91, 92. The output current of the rectifier is passed from the pole or terminal 91 through a single-pole switch 93 being controlled by the pedal 87 in the manner described presently. Connected in series with the switch 93 is a further double-pole switch 94 having a pair of contacts 95, 96 connectible to either of a pair of brushes or sliding contacts 97, 98 disposed diametrically to one another and sliding upon the rotating contact disk 99 of a position control device 100, the disk 99 being secured to and driven by the armshaft 86 of the sewing machine has a peripheral insulating segment 101 being engaged in succession by the brushes 97, 98 during rotation of the disk, the latter being electrically connected, through a brush and slip ring 102, to one terminal of the solenoid 82 whose remaining terminal is connected to the remaining pole or output terminal 92 of the rectifier 90.

In the following there will now be described the operation of the coupling, motion stoppage and position control device of the invention as shown by the drawings.

Upon closing of the master switch 89, FIG. 5, the rotor 10 of the coupling motor 1 is started to rotate, whereby to drive the flywheel 12 by way of the motor drive shaft 11. At the same time, shaft 11 drives the auxiliary coupling desk 17 at a reduced speed determined by the transmission ratio of the reduction gearing 15–27.

Depression of the foot pedal 87 by the operator in a known manner causes a deflection of the actuating lever 37 against the action of the spring 41, FIG. 1, whereby to shift the sleeve 34 and in turn the coupling disk 45 towards the left to an extent until the friction lining 46 engages the flywheel 12. As a consequence, the armshaft 86, FIGS. 1 and 5, of the sewing machine 84 is set in motion by way of the main coupling disk 45, output shaft 42, pulley 43 and chain 85, the speed of rotation of the shaft 86 during the sewing operation being controlled in a known manner, such as by variation of the contact pressure between the disk 45 and flywheel 12, or pressure applied to the pedal 87, respectively.

Stoppage of the sewing machine 84 at the end of a sewing operation is effected by release and return of the pedal 87 to its rest or starting position, whereby the main coupling disk 45 is disengaged from the flywheel 12 through the action of the spring 41 and decelerated or braked by engaging the braking disk 49. The latter is arrested or locked during rotation of the disk 45 by the clamping of wedging effect of the slide pin 58 engaging the inside of the groove 59 of the disk 49 under the influence of the ring 52 deflected about the eccentric pin 55 by the action of the spring 66. More specifically, the spring 66 causes rotation of the ring about pin 55 by urging, by way of the release lever 61, the nose of the ring 52 to a position of the pin 58 engaging the inside wall of the groove 59. Depending upon the direction of rotation of the motor 1, the spring 66 is inserted between either of the pins 67 and 69 and the end 64 of the lever 61, as will be understood.

Upon the pedal reaching its rest position, switch 93 is closed, whereby to establish a closed electric circuit traced from terminal 91 to terminal 92 of the rectifier 90 through switch 93, switch arm 94, switch contact 95 (in the position of the switch shown in the drawing), brush 97, contact disk 99 of the control device 100, brush 102 and solenoid 82. As a consequence, the solenoid is energized, whereby to attract the pull rod 81, FIG. 1, towards the right, which, in turn, results in the operation of the push rod 79 towards the right. As a consequence, the conical end 83 of rod 79 engages the guide lugs 70, 71 of the release lever 61, thus retracting the latter to its central or aligned position with the rod 79 against the action of the spring 66. Lever 61 in turn rotates the ring 52 by way of the nose 57 to its central position where the pin 58 is released from engagement with the groove 59 of the braking disk 49. The exact position of the ring 52 by the rod 79, that is, with the extension 57 being in line with the pivot pin 55 and the center of the braking disk 49, may be set by adjustment of the bolt or pivot 56.

Simultaneously with the operation of the push rod 79, lever 75 causes displacement of the auxiliary coupling shaft 31 towards the right by way of the projection 76 and against the action of spring 72, whereby to engage the disks 17 and 29 of the auxiliary coupling and to rotate the shaft 31 and, in turn, the output shaft 42 at a reduced speed. In other words, the armshaft 86 of the sewing machine is automatically restarted and driven at a reduced speed upon release of the pedal 87 and interruption of the main drive at the end of a sewing operation.

Upon starting of the auxiliary drive, the armshaft 86, in the example shown in FIG. 5, is rotated until the insulating segment 101 of the control device 100 engages the brush 97 as shown in the drawing, whereby to interrupt the circuit of the solenoid 82 and to, in turn, cause the spring 72 to displace the shaft 31 towards the left. As a consequence, the coupling disk 29 is disengaged from the disk 17, whereby to simultaneously release the lever 61 by way of lever 75 and push rod 79. The spring 66 now again rotates or urges the lever to a position where the pin 58 engages the inside wall of the groove 59, thus again locking or preventing rotation of the braking disk 49 in the respective operating direction of the main coupling disk 45.

The sewing machine may thus be stopped fully automatically at a predetermined position during its operating cycle determined by the position of the insulating segment 101 of the device 100, such for instance as in the "UP"-position of the needle. By reversing the switch arm 94 to close contact 96, stoppage of the machine is changed to a position spaced by 180° from the first stopping position, that is, corresponding to the "DOWN"-position of the needle in the example mentioned.

In the foregoing the invention has been described in reference to a specific illustrative device. It will be evident, however, that variations and modifications, as well as the substitution of equivalent parts or elements for those shown herein for illustration may be made in accordance with the broader scope and spirit of the invention as set forth on the appended claims. The specification and drawings are accordingly to be regarded in an illustrative rather than in a restrictive sense.

I claim:

1. In motor drive mechanism, a continuously running electric motor having a through-going hollow main drive shaft with a first end of said shaft projecting from one side and with the second end of said shaft projecting from the opposite side of said motor, main friction coupling means having a main driving coupling member directly secured to the first end of said shaft, auxiliary coupling means having an auxiliary driving coupling member, reduction gearing means operably connecting said auxiliary driving member with the second end of said shaft, an output shaft, a main driven coupling member mounted upon and axially displaceable relative to said output shaft, a rotatably mounted braking member for said main driven member, locking means to normally arrest said braking member, resilient means to normally urge said main driven member into engagement with said braking member, first operating means to disengage said main driven member from said braking member and to operate it into engagement with said main driving member, to rotate said output shaft at the motor speed by way of said main coupling means, an auxiliary drive shaft coaxial with and rotatively mounted within said main drive shaft, means coupling one end of said auxiliary drive shaft to said output shaft in axially yielding connection therewith, an auxiliary driven coupling member secured to the opposite end of said auxiliary drive shaft in normally disengaged position from said auxiliary driving member, and second operating means to operate said auxiliary driven member into engagement with said auxiliary driving member including means to simultaneously release said braking member, to drive said output shaft at reduced speed by way of said auxiliary coupling means.

2. In motor drive mechanism as claimed in claim 1, including means to automatically release said second operating means upon said output shaft, driven through said auxiliary coupling means, reaching a predetermined angular rotational position, and means to re-lock said braking member upon release of said second operating means.

3. In motor drive mechanism as claimed in claim 1, including means operative upon stoppage of said output shaft by disengagement of said main driving and driven members, to actuate said second operating means, to automatically re-start rotation of said output shaft at reduced speed.

4. In motor drive mechanism as claimed in claim 1, including means operative upon stoppage of said output shaft by disengagement of said main coupling means, to actuate said second operating means, to automatically re-start rotation of said output shaft at reduced speed, and further means to automatically release said second operating means and to stop said output shaft, driven through said auxiliary coupling means, upon reaching a predetermined angular rotational position, and means to re-lock said braking member upon release of said second operating means.

5. In motor drive mechanism as claimed in claim 1, said locking means being comprised of at least one coupling pin projecting into a circular groove concentric with the center of rotation of said braking member, the diameter of said pin being less than the width of said groove, a spring-loaded support for said pin mounted for rotation about a pivot eccentric in respect to the center of said braking member, to urge said pin against an inside wall of said groove, said means to release said braking member being operative to adjust said support to a position to maintain said pin midway between the walls of said groove.

6. In motor drive mechanism as claimed in claim 1, including operating means having a rest and a control position, to disengage and engage respectively, said main driving and driven members said second operating means being comprised of an electromagnetic device energized upon said first operating means assuming its rest position, to engage said auxiliary driving and driven members and to release said braking member.

7. In motor drive mechanism as claimed in claim 1, including operating means having a rest and a control position, to disengage and engage, respectively, said main driving and driven members, said second operating means being comprised of an electromagnetic device energized upon said operating means assuming its rest position, to engage said auxiliary driving and driven members and to release said braking member, whereby to rotate said output shaft at reduced speed, and rotatable contact means driven by said motor to de-energize said electromagnetic device upon said output shaft reaching a predetermined angular position.

8. In motor drive mechanism, a continuously running electric motor having a through-going hollow main drive shaft with the first end of said shaft projecting from one side and with the second end of said shaft projecting from the opposite side of said motor, an output shaft, first releasable friction coupling means including rotatable coupling and braking members operably connecting the first end of said shaft with said output shaft, adjustable locking means to arrest and release the braking member of said coupling means, first operating means for said coupling means, to drive said output shaft at the motor speed in the arrested position of said braking member, an auxiliary drive shaft rotatively mounted within said main drive shaft and having one end connected to said output shaft, auxiliary coupling means including reduction gearing means connecting said main drive shaft to the opposite end of said auxiliary drive shaft, to drive said output shaft at reduced speed in the released position of said braking member, and second operating means for said auxiliary coupling means and said locking means, to engage said auxiliary coupling means while releasing said locking means, and to disengage said auxiliary coupling means while arresting said locking means, respectively.

9. In motor drive mechanism as claimed in claim 8, including means interlocking said first and second operating means, to restart said output shaft at reduced speed by engagement of said auxiliary coupling means upon stoppage of said output shaft from full motor speed by disengagement of said main coupling means.

10. In motor drive mechanism as claimed in claim 8, including means interlocking said first and second operating means, to restart said output shaft at reduced speed by engagement of said auxiliary coupling means upon stoppage of said output shaft from full motor speed by disengagement of said main coupling means, said second operating means being comprised of an electromagnetic device energized upon engagement of said first coupling means, and means to de-energize said device upon said output shaft assuming a predetermined angular position.

References Cited by the Examiner
UNITED STATES PATENTS

| | | | |
|---|---|---|---|
| 2,905,121 | 9/1959 | Gerband | 112—219 |
| 2,912,947 | 11/1959 | Gerband | 112—219 |

DAVID J. WILLIAMOWSKY, *Primary Examiner.*